H. W. AKROYD.
OPTICAL TOY.
APPLICATION FILED JULY 9, 1921.

1,419,657.

Patented June 13, 1922.

INVENTOR.
Harry White Akroyd
BY Butler + Denny
ATTORNEYS.

UNITED STATES PATENT OFFICE.

HARRY WHITE AKROYD, OF PHILADELPHIA, PENNSYLVANIA.

OPTICAL TOY.

1,419,657.  Specification of Letters Patent.  Patented June 13, 1922.

Application filed July 9, 1921. Serial No. 483,505.

*To all whom it may concern:*

Be it known that I, HARRY WHITE AKROYD, a British subject, residing in the city of Philadelphia, county of Philadelphia, and State of Pennsylvania, have invented a certain new and useful Optical Toy, of which the following is a specification.

This invention is an optical top relating to motion pictures, and it is designed to provide a simple, inexpensive and entertaining device for creating the illusion of an object or objects in motion due to persistency of vision.

The characteristic features of my improvements are set out in the following description and the accompanying drawings in illustration thereof.

Figure 1:
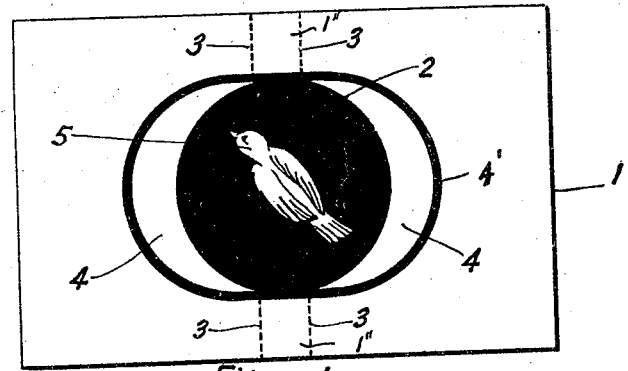
Figure 2:
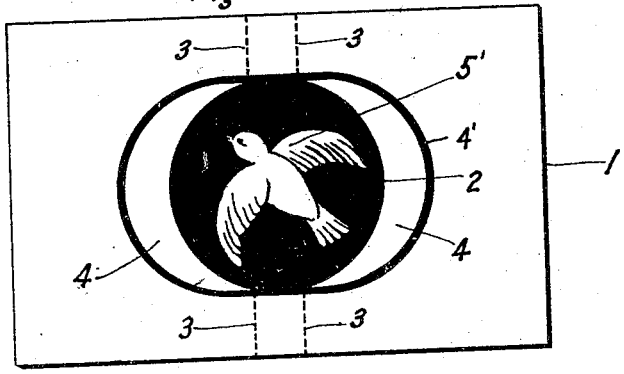
Figure 3:
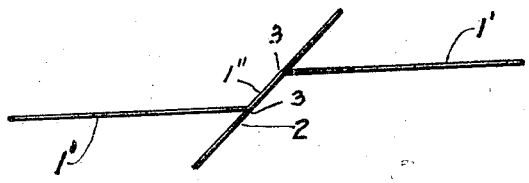
Figure 4:
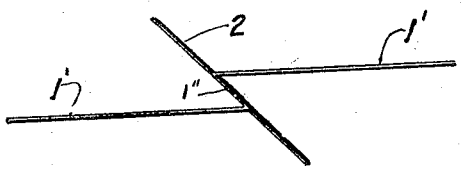

In the drawings, Fig. 1 is a view showing one side of an expanded toy embodying my improvements; Fig. 2 is a view showing the other side of the expanded toy; Fig. 3 is a top plan view showing one of the angular positions of the hinged members comprised in the toy, and Fig. 4 is a top plan view representing a second position of the same.

The toy, in the form thereof illustrated, can be produced by stamping or cutting out of a sheet of material such as paper, the integral form 1 containing the symmetrically arranged and oppositely disposed crescent shaped apertures 4 between which is the disk 2 having on opposite sides thereof an object as the bird shown, represented in the different positions 5 and 5'. Parallel scores 3 provide the form 1 with the relatively movable end sections 1' and the intermediate sections 1'' hinged on such lines, the top and bottom of the disk 2 being fixed to the aligned intermediate sections 1'' and movable therewith.

An oval band 4' outlines the convex or outer edges of the crescent shaped openings 4 and, as shown, has the same color as the background of the disk 2 on which is shown the figure of a bird in white, the band forming a circle or circular border for the disk when the same has been turned from its position shown in Figs. 1 and 2 through a half circle or when the section 1'' has been turned on the hinges 3 so that it lies between the sections 1', the three parts being in laminated relation.

In operation, the parts 1' are grasped by the hands and moved rapidly back and forth in opposite directions so as to rapidly oscillate the disk 2 with resulting rapid oscillation of the Figures 5 and 5' and their presentation in succession to the eye of the observer, which, due to the persistency of vision, sees these figures in animated form or as a bird in motion.

Having described my invention, I claim:

1. A toy comprising a section having different figures of the same object on opposite sides thereof and members connected to said section by hinges and adapted when moved in opposite directions to oscillate said section and present the different figures alternately in succession to the eye of an observer.

2. A toy comprising a sheet of material having symmetrical apertures cut therein, a figure disposed between said apertures, and parallel hinges between said figure and end sections, whereby the movement of said end sections in opposite directions oscillates said figure.

3. A toy comprising a sheet of paper having crescent shaped apertures formed therein and a disk formed thereby, said disk having different figures of the same object thereon, and parallel creases whereby said disk is hinged to the ends of said sheet.

4. A toy comprising a sheet of paper divided by parallel scores and crescent shaped openings into an intermediate and end sections, said intermediate section comprising a figure and said openings having an outline adapted to conform with said figure.

In testimony whereof I have hereunto set my name this 5th day of July, 1921.

HARRY WHITE AKROYD.